(12) United States Patent
Sadato et al.

(10) Patent No.: US 6,777,356 B2
(45) Date of Patent: Aug. 17, 2004

(54) LUMINOUS COMPOSITE FABRIC AND GARMENT

(75) Inventors: Hiroki Sadato, Okayama-ken (JP); Kiminobu Yamamuro, Okayama (JP)

(73) Assignee: Japan Gore-Tex, Inc., Tokyo (JP)

( * ) Notice: Subject to any disclaimer, the term of this patent is extended or adjusted under 35 U.S.C. 154(b) by 174 days.

(21) Appl. No.: 09/947,197

(22) Filed: Sep. 5, 2001

(65) Prior Publication Data

US 2002/0076534 A1 Jun. 20, 2002

(30) Foreign Application Priority Data

Sep. 5, 2000 (JP) .......................................... 2000-269336

(51) Int. Cl.[7] ................................................. B32B 5/18
(52) U.S. Cl. .......................... 442/76; 428/195; 442/77; 442/70; 442/71; 442/72; 442/73; 442/74; 442/141; 442/144; 442/145; 442/114; 442/68; 442/69
(58) Field of Search .............................. 428/195; 442/76, 442/77, 70–74, 114, 141, 144–145

(56) References Cited

U.S. PATENT DOCUMENTS 5,710,856 A * 1/1998 Ishii et al. .................. 385/146
5,811,174 A * 9/1998 Murakami .................. 428/195

FOREIGN PATENT DOCUMENTS

| JP | 57-65914 | | 10/1980 | |
|----|----------|---|---------|---|
| JP | 600285586 A | * | 7/1983 | .......... D06M/11/00 |
| JP | 58-135408 | | 9/1983 | |
| JP | 59-123125 | | 8/1984 | |
| JP | 7-12418 | | 2/1995 | |
| JP | 10-292257 | | 11/1998 | |
| JP | 11-50378 | | 2/1999 | |

* cited by examiner

*Primary Examiner*—Terrel Morris
*Assistant Examiner*—Lynda Salvatore
(74) *Attorney, Agent, or Firm*—Kevin J. Boland

(57) ABSTRACT

The present invention is a luminous fabric and garment that have excellent luminescent properties under conditions of poor lighting, that lose their luminescent properties only slightly due to wear degradation and the like during prolonged use, that have the same color tone and design as regular fabrics and garments during day use, and that possess excellent aesthetic qualities and are free from design limitations.

35 Claims, 3 Drawing Sheets

LUMINOUS COMPOSITE FABRIC AND GARMENT

BACKGROUND OF THE INVENTION

The present invention relates to a luminous composite fabric and garment endowed with luminous properties.

Research is currently being conducted concerning fabrics and garments endowed with luminescent properties in order to improve visibility and enhance safety when work is performed under conditions of poor lighting or when nighttime work is performed outdoors, and to achieve better aesthetic properties under conditions of poor lighting.

The following types of such luminous fabric are known: products obtained by coating or imprinting a fabric surface with a coating preparation containing a luminescent substance, or impregnating the fabric therewith (conventional products (1)), products obtained by bonding luminescent strips to fabric surfaces (conventional products (2)), and products in which luminescent materials are used as the filling tapes during garment manufacture, and the resulting garments are worn by being turned inside out as needed (conventional products (3)).

A specific example of conventional product (1) is disclosed in Japanese Unexamined Utility Model Application 57-65914 (reference 1), which describes a product obtained by completely or partially coating or imprinting a glove surface with a photo-storage pigment. In addition, Japanese Unexamined Utility Model Application 7-12418 (reference 2) discloses a completely colored luminous product obtained by dyeing a garment with a luminous pigment substantially free from radioactive materials. Japanese Unexamined Patent Application 10-292257 (reference 3) discloses a luminescent fibrous structure whose apparent surface area constitutes no more than 0.7 of the actual surface area and in which the fabric surface is coated with a prescribed amount of luminous pigment. Japanese Unexamined Patent Application 11-50378 (reference 4) discloses a breathable, waterproof, luminescence-regenerating, reflective printed fabric in which the fabric surface is coated in a dry state with a resin layer containing aluminum, silver or another light-reflecting substance, and the resin layer is then imprinted with a resin layer containing fine luminescent powder and glass beads.

A specific example of conventional product (2) is disclosed in Japanese Unexamined Utility Model Application 58-135408 (reference 5), which describes a luminescent piece of clothing obtained by bonding luminescent strips at prescribed locations on the obverse side of a piece of fabric.

A specific example of conventional product (3) is disclosed in Japanese Unexamined Utility Model Application 59-123125 (reference 6), which describes a garment in which a luminescent tape is attached as a sealing tape to the insides of garment seams, and the garment is turned inside out during nighttime emergencies to utilize the luminescence capabilities of the garment.

A drawback of the luminescent gloves of reference 1 or the luminescent fibrous structures of reference 3 is that the luminescent layers peel off over time due to outside exposure, and the luminescence capabilities thereof risk being compromised by the soiling of the surface layer and cannot be maintained for a sufficiently long time. Another drawback is that the aesthetic qualities of the products are compromised because the luminescent layers are exposed to the outside. Yet another drawback is that design limitations make it impossible to adapt these products to uniforms and other types of fixed-design clothing. In addition, the luminescent fibrous structures of reference 3 are three-dimensional, and hence their application was limited to breast sections, back sections, and other garment sections where said structures do not inhibit movement during wear, making it impossible to provide acceptable visibility at certain angles.

Similarly, the garment of reference 2 loses some of its luminescence capabilities over time due to the soiling of the surface layer, and thus cannot be regarded as acceptable because this garment remains luminescent for only a short time. Another drawback of the garment disclosed in reference 2 is that acrylic resin or another binder must be used in order to bond a luminous pigment to the fiber surface with sufficient durability, but a fabric obtained using such a binder is much less acceptable in terms of hand and moisture permeability. In addition, fabric colors are limited to light tones in order to provide adequate luminescence capabilities, imposing design limitations. The colors of the luminescent pigments themselves are also limited, making it difficult to obtain light color tones (such as white) and creating problems when such products are used, for example, to manufacture white rainwear for traffic control officers.

The luminescent printed fabric of reference 4 is obtained by employing a two-step process to coat the fabric surface with a resin, but this structure prevents a thin resin layer from being formed on the fabric, and is thus disadvantageous in that the moisture permeability or hand of the fabric are severely compromised. The use of polyurethane resin, which has excellent moisture permeability, for the resin layer has been suggested as a way of improving the moisture permeability of printed fabrics, but because the polyurethane resin takes up moisture, swells, and allows the moisture to penetrate into the film, the luminescent pigment is exposed to the moisture and hydrolyzed, losing some or all of its luminescence capabilities.

Because the luminous clothing of reference 5 is configured such that the luminescent layer is exposed on the clothing exterior, its luminescence capabilities decrease over time due to the soiling of the surface layer or the peeling off of the luminescent layer in the same manner as above, and can therefore be sustained only for a short time. The garment loses some of its hand and wear comfort due to the stiffening of the areas occupied by the luminescent strips, the luminescent material can be utilized only partially, the range of design options is limited because the luminescent layer must be exposed to the outside, and there is a risk that the aesthetic qualities will be compromised.

In the garment described in reference 6, the seams alone are provided with a luminescent tape, so the resulting luminescence is insufficient for providing good visibility. Cost and waterproofness considerations commonly dictate that a waterproof garment be patterned with a minimum possible number of seams. In addition, luminescent tape for stitches and jointed portions must remain inconspicuous because of design considerations. Such placement cannot provide good visibility. Another drawback is that when a luminescent tape is fused over a jointed portion, the joints and ends of the tape stand out, and the external appearance of the product is severely compromised. The luminophors used are commonly photo-storage materials, but because the garment of reference 6 can exhibit luminescence capabilities only after being turned inside out, the luminescent tape remains on the inside of the garment during normal wear and cannot store light because of the lack of exposure. A resulting drawback is that luminescence cannot be achieved in the absence of a light source for exciting the luminescent tape in an emergency.

Therefore, an object of the present invention, which was perfected in view of the above-described drawbacks, is to provide a luminous fabric and garment that have excellent luminescent properties under conditions of poor lighting, that lose their luminescent properties only slightly due to wear degradation and the like during prolonged use, that have the same color tone and design as regular fabrics and garments during day use, and that possess excellent aesthetic qualities and are free from design limitations.

These and other purposes of the present invention will become evident from review of the following specification.

SUMMARY OF THE INVENTION

An important feature of the luminous composite fabric pertaining to the present invention is that the reverse side of the fabric is covered partially or completely with a backing member containing a luminescent substance.

Another important feature of the luminous composite fabric pertaining to the present invention is that the reverse side of the fabric is covered partially or completely with a backing member via an adhesive, and a luminescent substance is added to the adhesive and/or the backing member.

Light emitted by the backing member containing a luminescent substance or by the adhesive containing a luminescent substance passes through the fabric and reaches the obverse side, providing excellent visibility under conditions of poor lighting. In addition, a fabric is commonly abraded, soiled, or the like from the obverse side, but because the backing member containing a luminescent substance or the adhesive containing a luminescent substance is disposed on the reverse side of the fabric, it is possible to prevent outside abrasion, soiling, or the like from occurring, so the luminescence capabilities are affected only slightly. In addition, the backing member containing a luminescent substance is provided on the reverse side of the fabric in the manner described above, preventing the design on the obverse side of the fabric from being affected in any way and making it possible to create the same pattern as that used on a regular fabric under conditions of poor lighting.

The fabric and the backing member may be brought into direct contact or disposed with an interposed adhesive or other member. The backing member may be a film, a fabric, a net, or a material applied in dots or stripes to the fabric.

The term "reverse side of fabric" refers to the portion on the reverse side that remains invisible from the outside when the luminous composite fabric is used, and is the surface facing the body when the luminous composite fabric is used as part of a garment. Conversely, the term "obverse side of fabric" refers to the surface on the obverse side that is visible from the outside when the luminous composite fabric is used, and is the surface disposed on the obverse side when the fabric is used as part of a garment.

The term "luminescent substance" refers to a light-emitting substance such as a substance exhibiting fluorescence or phosphorescence. Particularly preferred are photo-storage substances that store optical energy and continue to emit light after the optical stimulus is removed.

A substance containing an aluminate compound is preferred as the luminescent substance.

A material having a light transmittance of 10% or greater at 350 nm, and 15% or greater at 500 nm, should preferably be used as the luminous composite fabric pertaining to the present invention. This is because such a fabric is better suited for transmitting the light emitted by a luminescent substance or the optical energy provided to the luminescent substance.

In the luminous composite fabric pertaining to the present invention, the backing member should preferably be composed of a resin material. This is because a resin material is easier to add to a luminescent substance.

In the luminous composite fabric pertaining to the present invention, the resin material should preferably be composed of a moisture-permeable resin. This is because when, for example, the luminous composite fabric is used as part of a garment or the like, the garment remains breathable and comfortable to wear as long as the backing member remains moisture permeable.

In the luminous composite fabric pertaining to the present invention, the moisture-permeable resin should preferably have a stratified structure. Examples of stratified structures include film products and layers formed by coating fabrics with resins.

A stretched porous polytetrafluoroethylene film (hereinafter "a porous PTFE film") can be cited as a preferred example of the moisture-permeable resin. A porous PTFE film is waterproof and has excellent moisture permeability and flexibility, and is therefore preferred when, for example, the luminous composite fabric is used as part of a garment.

The porous PTFE film can be obtained by laminating two or more layers. When, for example, the porous PTFE film is obtained by laminating two or more layers, a pinhole or other defect formed in one layer of the porous PTFE film may compromise its waterproofness, but the other layer of the porous PTFE film will still remain waterproof. In preferred practice, a hydrophilic moisture-permeable resin (for example, urethane) is laminated to the porous PTFE film. This option is preferred because the hydrophilic moisture-permeable resin can prevent soil from depositing on the porous PTFE film.

Another preferred feature of the present invention is that the moisture-permeable resin be composed of a plurality of layers, the fabric-side layer of these plurality of layers contain a luminescent substance, and the layer on the opposite side be substantially devoid of a luminescent substance.

For example, a porous PTFE film containing a luminescent substance, and a porous PTFE film devoid of a luminescent substance may be laminated together such that the porous PTFE film devoid of a luminescent substance is disposed on the side opposite the fabric. This arrangement makes it easier for the obverse side of the fabric to be illuminated because the porous PTFE film on the side opposite the fabric reflects light emitted by the porous PTFE film on the fabric side.

Another feature of the present invention is that the plurality of layers should preferably be laminated such that the moisture-permeable resin substantially devoid of a luminescent substance is caused to partially penetrate into the moisture-permeable voids of the moisture-permeable resin layer containing a luminescent substance.

For example, a porous film containing a luminescent substance may be used as a moisture-permeable resin layer in the above-described manner, and a coating may be formed such that a hydrophilic moisture-permeable resin is caused to partially penetrate into the pores of the porous film.

Still another feature of the present invention is that the moisture-permeable resin containing a luminescent substance should preferably be a stretched porous polytetrafluoroethylene film, and the moisture-permeable resin layer substantially devoid of a luminescent substance should preferably be urethane.

The luminous composite fabric pertaining to the present invention is that the backing member should also have adhesive properties and occupy 5–90% of the surface area on the reverse side of the fabric. This is because an excessively narrow bonding area fails to yield adequate adhesive strength. Another reason is that a backing member exhibiting adhesive properties commonly has low moisture permeability, and an excessively wide bonding area yields low moisture permeability and compromises wear comfort when the luminous composite fabric is made into a garment. Examples of such backing members include meshes, dots, and stripes.

Yet another preferred feature of the luminous composite fabric pertaining to the present invention is that the surface of the backing member farther away from the fabric be provided with a protective layer. In other words, the outer reverse surface should preferably be provided with a protective layer. The protective layer may be a fabric or a film and may be attached to the backing member directly or via an adhesive.

The main point of the garment pertaining to the present invention is that the above-described luminous composite fabric is used over all or part of the garment surface, with the obverse side of the fabric positioned on the side away from the body. This garment remains highly visible under conditions of poor lighting because a luminous composite fabric capable of emitting light is used on the obverse side of the fabric in the manner described above.

DESCRIPTION OF THE DRAWINGS

The operation of the present invention should become apparent from the following description when considered in conjunction with the accompanying drawings, in which.

DETAILED DESCRIPTION OF THE INVENTION

Figure 1:
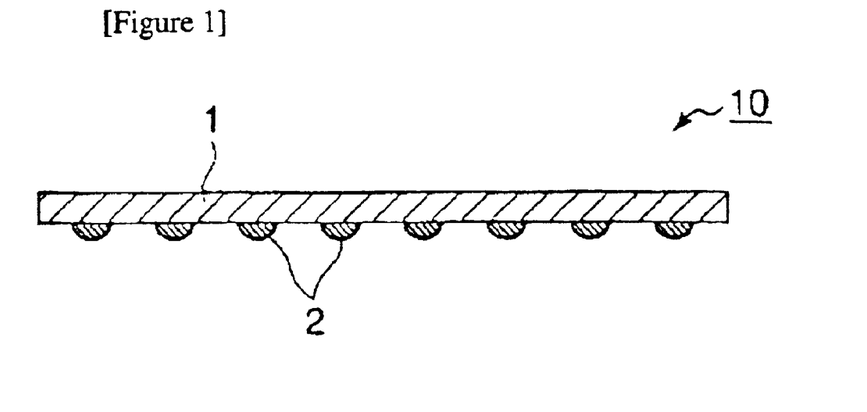
FIG. 1 is a schematic cross section depicting the luminous composite fabric pertaining to embodiment 1 of the present invention.

FIG. 1 is a schematic cross-sectional view of a luminous composite fabric 10 pertaining to embodiment 1 of the present invention. In the luminous composite fabric 10 of embodiment 1, adhesive sections (backing member containing a luminescent substance) 2 are partially bonded to the reverse side of a fabric 1.

The adhesive sections 2 are illuminated by the luminescent substance, and the afterglow generated by the adhesive sections 2 can be seen through the fabric 1 when the luminous composite fabric 10 is viewed from the obverse side.

Known methods may be used to fabricate the luminous composite fabric 10 of embodiment 1. Examples include (1) methods in which an adhesive (adhesive sections 2) containing a luminescent substance is applied to the fabric 1 with the aid of a roll having a gravure pattern, and (2) methods in which the fabric 1 is sprayed with an adhesive (adhesive sections 2) containing a luminescent substance.

As noted above, the coating area of the adhesive sections 2 should preferably be 5–90% because adequate luminescence capabilities are difficult to achieve when the coating area is less than 5%. An area of 10% or greater is even more preferred. Because the moisture permeability of the resulting luminous composite fabric 10 is likely to decrease when the area exceeds 90%, an area of 80% or less is preferred.

The adhesive sections 2 may be shaped as characters or drawing patterns over part of the surface. For example, using the luminous composite fabric of embodiment 1 as part of a garment allows a brand name, company name, or drawing pattern formed by the adhesive sections 2 on the reverse side of the fabric 1 to be viewed through the fabric 1, making this approach effective in terms of improving the aesthetic qualities of the garment or making it easier to recognize the brand name or company name. The aesthetic qualities or visibility can be improved even further by preparing several types of adhesives containing luminescent substances of various colors, and forming the aforementioned characters or drawing patterns by combining these colors.

Figure 2:
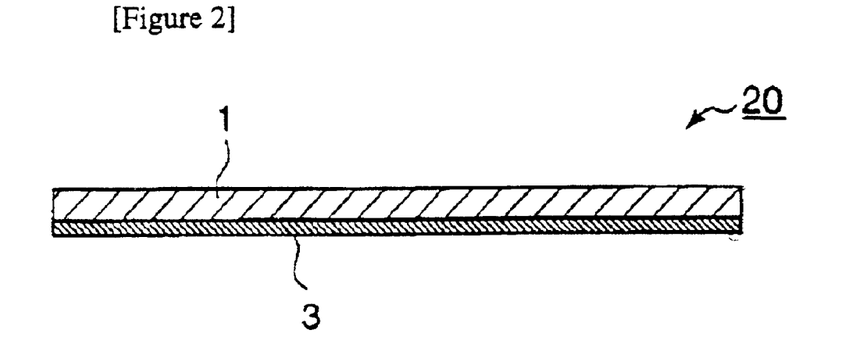
FIG. 2 is a schematic cross section depicting the luminous composite fabric pertaining to embodiment 2 of the present invention.

FIG. 2 is a schematic cross-sectional view of a luminous composite fabric 20 pertaining to embodiment 2 of the present invention. In the luminous composite fabric of embodiment 2, a moisture-permeable resin layer (backing member containing a luminescent substance) 3 is laminated over the entire reverse side of a fabric 1.

Using a breathable, yet waterproof material for the moisture-permeable resin layer 3 allows the luminous composite fabric 20 to be waterproof and breathable at the same time, making the luminous composite fabric 20 suitable for use in rainwear, for example.

In embodiment 2 as well, the afterglow generated by the luminescent substance contained in the moisture-permeable resin layer 3 can be seen through the fabric 1 when the luminous composite fabric 20 is viewed from the obverse side thereof.

The luminous composite fabric 20 of embodiment 2 can be fabricated by a known method. For example, the moisture-permeable resin layer 3 can be formed on the reverse side of the fabric 1 by a method in which the moisture-permeable resin is applied to the reverse side of the fabric 1 by means of gravure rolls, reverse rolls, kiss rolls, or the like, or by dipping, spraying, or the like.

The moisture-permeable resin layer 3 may be a product partially containing a luminescent substance, or a product obtained by preparing several types of moisture-permeable resins containing luminescent substances and having different colors, and combining these colors. Characters or drawing patterns can be formed using such products. When, for example, the luminous composite fabric of embodiment 2 is used as part of a garment, the reverse side of the fabric can be provided with the moisture-permeable resin layer 3 drawn in the form of a brand name, a company name, or a drawing pattern visible through the fabric 1. This arrangement makes it possible to further improve the aesthetic qualities of the garment and the visibility of a brand name or company name. In addition, it is expected that exceptional aesthetic qualities and visibility can be obtained by combining moisture-permeable resins containing luminescent substances and having a plurality of colors.

Figure 3:
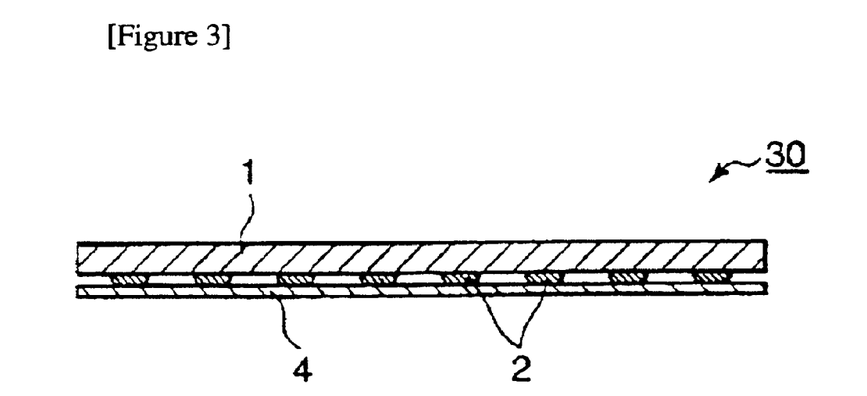
FIG. 3 is a schematic cross section depicting the luminous composite fabric pertaining to embodiment 3 of the present invention.

FIG. 3 is a schematic cross-sectional view of a luminous composite fabric 30 pertaining to embodiment 3 of the present invention. In the luminous composite fabric 30 of embodiment 3, a moisture-permeable resin film (backing member) 4 devoid of a luminescent substance is laminated on the reverse side of a fabric 1 via adhesive sections 2 containing the luminescent substance.

Using a waterproof film such as a porous PTFE film for the moisture-permeable resin film 4 allows the luminous composite fabric 30 to be waterproof and breathable at the same time, making it suitable for use in rainwear and the like.

The luminous composite fabric 30 of embodiment 3 is similar to the fabric of embodiment 1 in that the afterglow emitted by the luminescent substance contained in the adhesive sections 2 can be seen through the fabric 1 when the luminous composite fabric 30 of embodiment 3 is viewed from the obverse side.

Known methods may be used to fabricate the luminous composite fabric 30 of embodiment 3. Examples include (1) methods in which the moisture-permeable resin film 4 is coated with an adhesive (adhesive sections 2) containing a luminescent substance by making use of a roll provided with a gravure pattern, a fabric 1 is superposed from above, and the components are pressure-bonded with the aid of a roll, and (2) methods in which the moisture-permeable resin film 4 is sprayed with an adhesive (adhesive sections 2) containing a luminescent substance, a fabric 1 is superposed from above, and the components are pressure-bonded with the aid of a roll.

As noted above, the bonding area maintained during lamination should preferably fall within a range of 5–90%. This is because a bonding area less than 5% will make it more likely that the moisture-permeable resin film 4 and the fabric 1 will not be bonded sufficiently firmly together, whereas applying the adhesive sections 2 in an excessively small amount will make it more difficult to provide adequate luminescence capabilities. An area of 10% or greater is even more preferred. On the other hand, a bonding area greater than 90% is likely to reduce the moisture permeability of the luminous composite fabric 30 and to make the resulting garment less comfortable to wear. An area of 80% or less is even more preferred.

Figure 4:
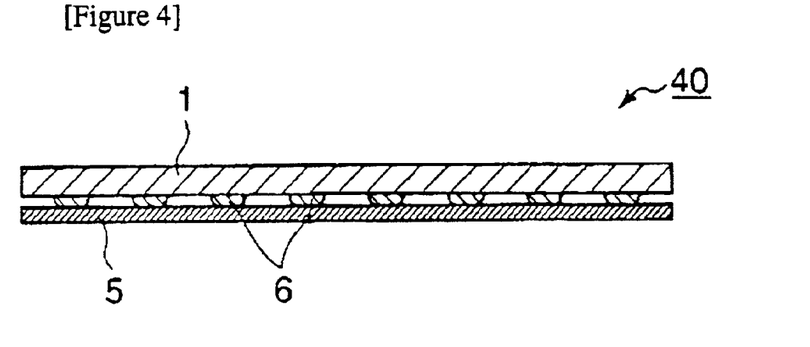
FIG. 4 is a schematic cross section depicting the luminous composite fabric pertaining to embodiment 4 of the present invention.

FIG. 4 is a schematic cross-sectional view of a luminous composite fabric 40 pertaining to embodiment 4 of the present invention. In the luminous composite fabric 40 of embodiment 4, a moisture-permeable resin film (backing member) 5 containing a luminescent substance is laminated on the reverse side of a fabric 1 via adhesive sections 6 devoid of the luminescent substance.

In embodiment 4, the afterglow emitted by the luminescent substance contained in the moisture-permeable resin film 5 can be seen through the fabric 1 when the luminous composite fabric 40 is viewed from the obverse side.

The luminous composite fabric 40 of embodiment 4 can be fabricated by the same methods as those employed for the luminous composite fabric of embodiment 3.

Figure 5:
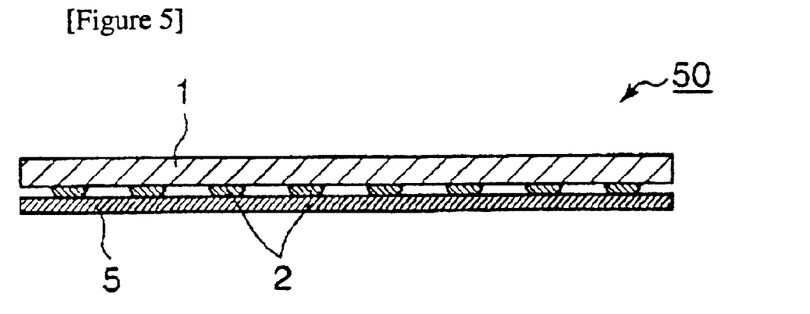
FIG. 5 is a schematic cross section depicting the luminous composite fabric pertaining to embodiment 5 of the present invention.

FIG. 5 is a schematic cross-sectional view of a luminous composite fabric 50 pertaining to embodiment 5 of the present invention. In the luminous composite fabric 50 of embodiment 5, a moisture-permeable resin film 5 containing the luminescent substance is laminated on the reverse side of a fabric 1 via adhesive sections 2 containing a luminescent substance.

The afterglow emitted by the luminescent substance contained in the moisture-permeable resin film 5 and the adhesive sections 2 can be seen through the fabric 1 when the luminous composite fabric 50 is viewed from the obverse side. Embodiment 5 thus possesses enhanced luminescence capabilities because both the adhesive sections 2 containing the luminescent substance and the moisture-permeable resin film 5 containing the luminescent substance contribute to creating luminescence.

The luminous composite fabric 50 of embodiment 5 can be fabricated by the same methods as those employed for the luminous composite fabric 30 of embodiment 3.

Figure 6:
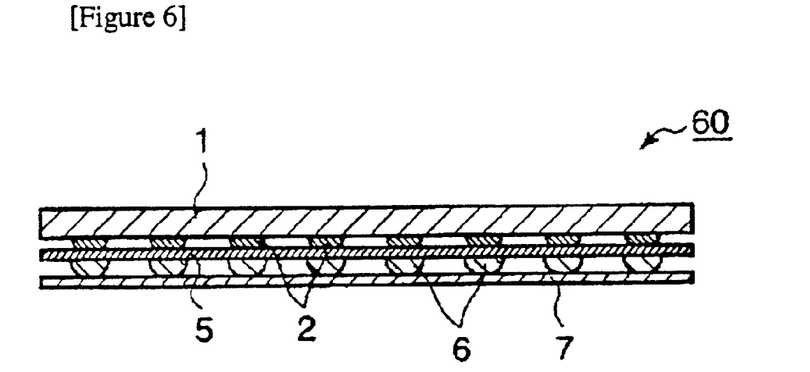
FIG. 6 is a schematic cross section depicting the luminous composite fabric pertaining to embodiment 6 of the present invention.

FIG. 6 is a schematic cross-sectional view of a luminous composite fabric 60 pertaining to embodiment 6 of the present invention. In the luminous composite fabric 60 of embodiment 6, a protective fabric (protective layer) 7 is laminated via adhesive sections 6 devoid of a luminescent substance on the side of the luminous composite fabric 50 of embodiment 5 facing the moisture-permeable resin film 5.

The function of the protective fabric 7 is to protect the moisture-permeable resin film 5 from external physical loads. When, for example, the luminous composite fabric 60 is used to manufacture a rain gear such that the reverse side of the fabric faces the body, the luminous composite fabric 60 experiences frictional loads exerted by the wearer, frictional loading occurs between parts of the fabric 60, and the material is bent, twisted, rubbed, and subjected to other types of physical loading during washing. Creating a structure in which the moisture-permeable resin film 5 is exposed on the reverse side of the luminous composite fabric makes it more likely that the above-described physical loading will damage the moisture-permeable resin film 5. In particular, large physical loads are applied to rainwear and other garments used during heavy work or the like, further increasing the likelihood of damage to the moisture-permeable resin film 5. Consequently, laminating the protective fabric 7 on the reverse side of the luminous composite fabric 60 protects the moisture-permeable resin film 5, prevents it from being damaged, and makes the product more durable.

Although it is theoretically possible to provide the side of the luminous composite fabric 50 facing the body with a lining (such as a reinforcing material composed of a woven or knit product), this approach is disadvantageous in the sense that the manufacturing costs of rainwear would rise and that the resulting garments will be less comfortable to wear because the liner clings to the body of the wearer. Consequently, the presence of the luminous composite fabric 60 ensures that good draping qualities can be maintained during wear with only a minimal increase in the manufacturing costs of the rainwear.

In embodiment 6, the afterglow emitted by the luminescent substance contained both in the moisture-permeable resin film 5 and in the adhesive sections 2 can be seen through the fabric 1 when the luminous composite fabric 60 is viewed from the obverse side in the same manner as in embodiment 5.

The luminous composite fabric 60 of embodiment 6 can be fabricated by combining the manufacturing methods described with reference to embodiment 3 above. Examples include (1) methods in which the luminous composite fabric 50 of embodiment 5 is fabricated as described above, the side of the luminous composite fabric 50 facing the moisture-permeable resin film 5 is coated with an adhesive (adhesive sections 6) devoid of a luminescent substance by making use of a roll provided with a gravure pattern, a protective fabric 7 is superposed from above, and the components are pressure-bonded with the aid of a roll, and (2) methods in which the side of the luminous composite fabric 50 facing the moisture-permeable resin film 5 is sprayed with an adhesive (adhesive sections 6) devoid of a luminescent substance, a protective fabric 7 is superposed from above, and the components are pressure-bonded with the aid of a roll.

The bonding area maintained during lamination should preferably fall within a range of 5–90% both on the side of the fabric 1 and on the side of the protective fabric 7. This is because a bonding area less than 5% will make it more likely that the moisture-permeable film 5 and the fabric 1, or the moisture-permeable film 5 and the protective fabric 7, will not be bonded sufficiently firmly together or that adequate luminescence capabilities will be more difficult to obtain. An area of 10% or greater is even more preferred. On the other hand, a bonding area greater than 90% is likely to reduce the moisture permeability of the resulting luminous composite fabric 60. An area of 80% or less is even more preferred.

Figure 7:
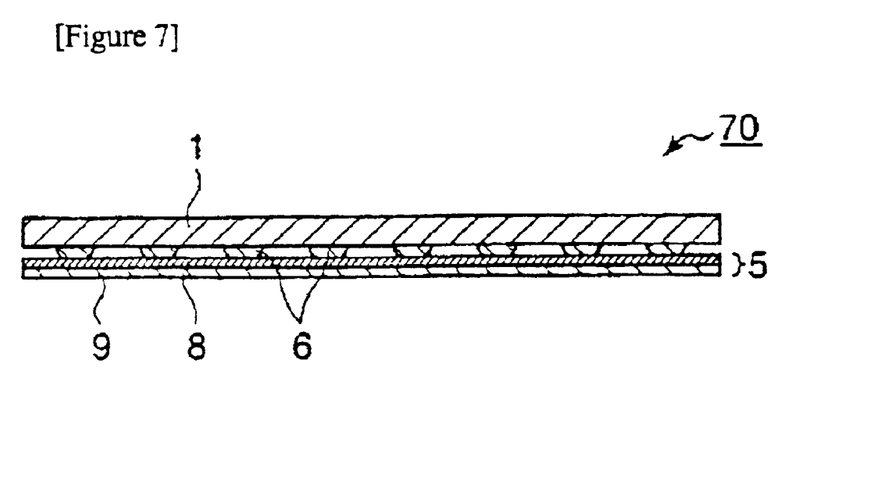
FIG. 7 is a schematic cross section depicting the luminous composite fabric pertaining to embodiment 7 of the present invention.

FIG. 7 is a schematic cross-sectional view of a luminous composite fabric 70 pertaining to embodiment 7 of the present invention. In the luminous composite fabric 70, a composite film obtained by laminating a porous PTFE film 8 containing a luminescent substance and a porous PTFE film 9 devoid of the luminescent substance is used as the moisture-permeable resin film 5 of embodiment 4. The rest of the structure is the same as in embodiment 4.

As in embodiment 7, the afterglow emitted by the luminescent substance contained in the porous PTFE film 8 can be seen through the fabric 1 when the luminous composite fabric 70 is viewed from the obverse side. In this case, more light is generated on the side of the fabric 1 because the function of the porous PTFE film 9 devoid of a luminescent substance is to reflect light coming from the porous PTFE film 8 containing the luminescent substance.

Figure 8:
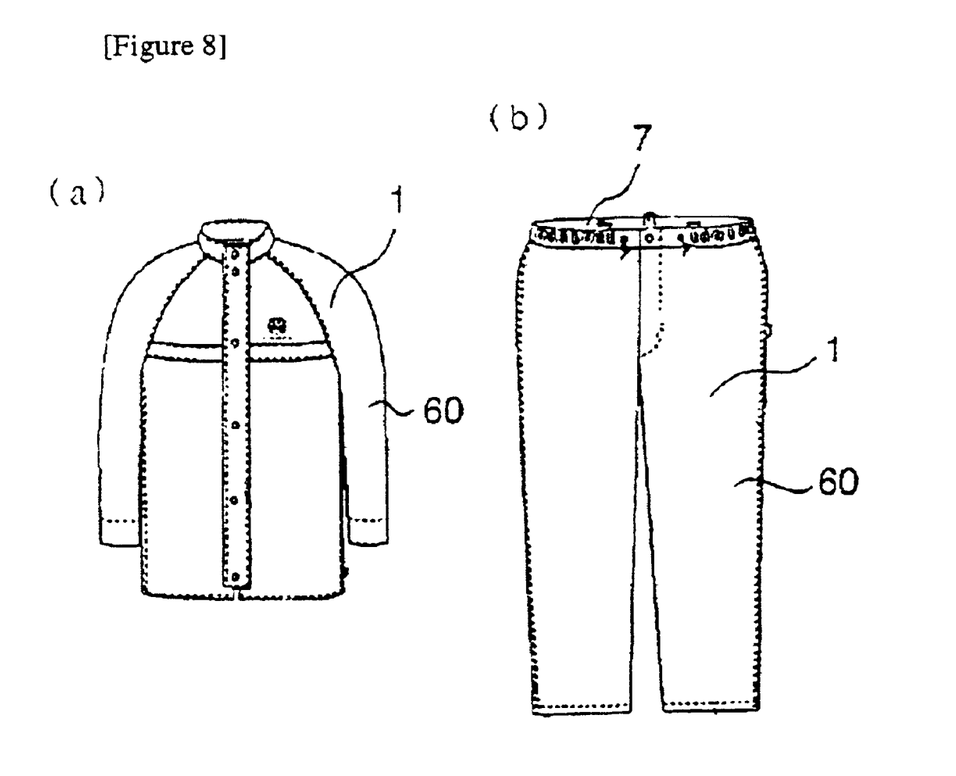
FIG. 8 is a schematic front view of the rain garment pertaining to embodiment 8 of the present invention.

FIG. 8 is a front view of a rain garment pertaining to embodiment 8 of the present invention. FIG. 8(a) shows the top part of the garment; FIG. 8(b), the trousers.

The rain garment of embodiment 8 is obtained by employing the luminous composite fabric 60 of embodiment 6 for the entire surface of the garment, with the fabric 1 facing outward.

The afterglow emitted by the luminescent substance contained in the resin layer (adhesive sections 2 and moisture-permeable resin film 5) on the outside of the rain garment can be seen through the fabric 1 when the rain garment of embodiment 8 is viewed.

The rain garment of embodiment 8 may be fabricated by a known method. For example, the following fabrication method can be used: a luminous composite fabric 60 fabricated as described above is cut according to a rainwear pattern, the parts of the luminous composite fabric 60 thus cut are sewn together such that the reverse side of the luminous composite fabric 60 faces inside the rain garment, and a filling tape is bonded, fused, or otherwise secured over the seams as needed.

Acceptable luminous composite fabrics are not limited to the luminous composite fabric 60 of embodiment 6 alone and include, among other things, the luminous composite fabrics of embodiments 1–5 and 7.

Materials for Luminous Composite Fabric

Following is a description of materials used for the luminous composite fabric and garment pertaining to the present invention.

The luminescent substance may be any material exhibiting fluorescence or phosphorescence. Examples include photo-storage powders that absorb energy when irradiated with sunlight or light from a fluorescent lamp, incandescent lamp, mercury lamp, or the like, and that emit an afterglow visible to the unaided eye under conditions of poor lighting after the irradiation has stopped.

The wavelength of the light energy absorbed by the luminescent substance should preferably have a peak between 250 and 450 nm, and the wavelength of emitted light should preferably have a peak between 420 and 660 nm. Examples of corresponding fine luminescent powders include ceramics obtained by mixing and baking aluminate compounds and rare-earth elements. For example, $SrAl_2O_4$, $Sr_4Al_{14}O_{25}$, and other oxides may be used as principal components, and Eu, Dy, and other rare-earth elements may be used as activators. N-Yako® (Nemoto & Co.) and Pikariko® (Chemitec) can be cited as specific examples.

When the luminescent substance is a particulate material, the grain size thereof should preferably be 0.5–50 $\mu$m. This is because a luminescent substance measuring less than 0.5 $\mu$m becomes bulky and cannot be added to a resin in a high mass ratio, making it more likely that the resulting resin will have inadequate luminescent properties. A size of 1 $\mu$m or greater is even more preferred. A luminescent substance whose grain size is greater than 50 $\mu$m has high hardness, abrades the metal surfaces of the equipment for adding the substance to resins, and causes this equipment to break down. A size of 30 $\mu$m or less is even more preferred.

The afterglow color of the luminescent substance may be blue, green, orange, or the like, and is appropriately selected according to the intended use. For example, the photo-storage agents (Ultra Glow Series) of Nichia Corporation have the following five colors: purplish blue, blue green, green, yellowish orange, and reddish orange.

Resins based on the following compounds can be used as the base resin materials for the aforementioned adhesive sections 2 and 6: polyester, polyamide, polyurethane, silicone, polyacrylic, polyvinyl chloride, polybutadiene, rubber, polyolefins, and the like.

Expressed as the content of the luminescent substance in a base resin material, the mixing ratio of the base resin material and the luminescent substance should preferably be 1–80 mass percent. This is because a luminescent substance content of less than 1% fails to provide the adhesive sections 2 with adequate luminescence and yields a luminous composite fabric whose visibility cannot be regarded as sufficient or practical. A ratio of 5 mass percent or greater is even more preferred. If the content of the luminescent substance exceeds 80 mass percent, the adhesive sections 2 lose some of their strength, these adhesive sections 2 tend to peel off from the fabric 1, it becomes impossible to create adequate adhesive force between the fabric 1 and the moisture-permeable resin film 4 or 5 when the fabric 1 and the moisture-permeable resin film 4 or 5 are laminated via the adhesive sections 2 in the same manner as in embodiments 3–7, and the resulting luminous composite fabric is more likely to possess inadequate physical durability. A ratio of 30 mass percent or less is even more preferred.

A known method may be used for adding the luminescent substance to a base resin material. It is possible, for example, to use a method in which a predetermined amount of luminescent substance is added to and mixed with the base resin material used for the adhesive by means of a biaxial kneader or a three-roll mill. The adhesive containing the luminescent substance is subsequently applied to a fabric.

Following is a description of the moisture-permeable resin layer 3 used in the present invention.

A known hydrophilic resin obtained from a synthetic resin should preferably be used for the moisture-permeable resin layer 3. Examples include macromolecular materials that are insoluble in water, can swell in water, and have hydrophilic groups such as hydroxyl, carboxyl, sulfone, and amino acid groups. Specific examples include at least partially crosslinked polyvinyl alcohol, cellulose acetate, nitrocellulose, and other hydrophilic resins, as well as hydrophilic polyurethane resins. Of these, hydrophilic polyurethane resins are particularly preferred because of considerations related to heat resistance, chemical resistance, processibility, moisture permeability, and the like. Suitable hydrophilic polyurethane resins include polyester- or polyether-based polyurethanes or pre-resins containing hydrophilic groups such as hydroxy, amino, carboxyl, sulfone, and oxyethylene groups. Diisocyanates, triisocyanates (containing two or more isocyanate groups), and adducts thereof can also be employed (singly or as mixtures) as cross-linking agents in order to adjust the melting points (softening points) of the resins. Bifunctional or higher polydiols, polytriols, diamines, and triamines may also be used as curing agents for isocyanate-terminated pre-resins. Bifunctional compounds are preferred over trifunctional compounds because of improved moisture permeability.

Following is a description of the moisture-permeable resin films 4 and 5 used in the present invention.

Although a conventionally known waterproof breathable resin film may be used as the moisture-permeable resin film, it is better to use a hydrophilic nonporous resin film, a hydrophobic porous film, or the like.

It is particularly preferable to use a hydrophobic porous film because certain types of luminescent substance, when added to a moisture-permeable resin film (moisture-permeable resin film 5), make this film less resistant to hydrolysis. In addition, luminescent substances decompose and other problems occur when a hydrophilic resin film is used for a long time in a highly moist environment.

The hydrophilic nonporous resin film may be the same material as that used for the aforementioned moisture-permeable resin and fashioned into a film. A conventionally known method may be used for such film forming. For example, it is possible to use extrusion or coating (a method in which a resin is applied to release paper, and the release paper is removed once the resin has cured).

The luminescent substance may be added to the hydrophilic resin film by a method in which the resin is mixed with the luminescent substance before being made into a film. A conventionally known method may be used to mix the resin and the luminescent substance. It is possible, for example, to mix the components using a biaxial kneader or a three-roll mill.

The hydrophobic porous film may be a hydrophobic open-cell film obtained from a synthetic resin, such as a porous film based on a polyolefin resin or fluororesin. When a porous film based on polyethylene, polypropylene, or another polyolefin resin is used, this resin is rendered water-repellent with a fluorine-based water repellent, a silicone-based water repellent, or the like. Examples of porous films based on fluororesins include porous films made of polytetrafluoroethylene, tetrafluoroethylene/ hexafluoropropylene copolymers, polyvinyl fluoride, and polyvinylidene fluoride. Of these, porous polytetrafluoroethylene films (porous PTFE films) obtained by the stretching of polytetrafluoroethylene are particularly preferred because of their ability to yield high-porosity films and to achieve excellent flexibility, hydrophobic properties, chemical resistance, and heat resistance.

The luminescent substance may be added to the hydrophobic porous film by the same method as that described above. In this method, the resin is mixed with the luminescent substance before being fashioned into a film.

The hydrophobic porous film should preferably have a maximum pore diameter of 0.01–10 μm. This is because when the diameter is less than 0.01 μm, the film is more difficult to fabricate. A diameter of 0.1 μm or greater is even more preferred. It is unsuitable for the hydrophobic porous film to have a maximum pore diameter greater than 10 μm because in this case the film possesses reduced water resistance and strength, and is hence more difficult to handle during coating, lamination, and subsequent processes. A diameter of 1 μm or less is even more preferred. The maximum pore diameter should be measured by a method based on ASTM F-316.

The hydrophobic porous film should preferably have a porosity of 50–98%. The reason is that the moisture permeability of the resulting luminous composite fabric decreases if the porosity of the hydrophobic porous film is less than 50%. A porosity of 60% or greater is even more preferred. Film strength decreases if the porosity exceeds 98%. A porosity of 95% or less is even more preferred. The porosity is determined by a method in which apparent density is measured according to JIS K 6885, and the apparent density (ρ) thus measured is used to calculate the porosity according to Eq. (1).

$$\text{Porosity } (\%) = (2.2 - \rho)/2.2 \times 100 \tag{1}$$

The same method is used elsewhere in the document for porosity measurements.

The hydrophobic porous film should preferably have a thickness of 7–300 μm. The reason is that a thickness less than 7 μm makes the film more difficult to handle during fabrication, whereas a thickness in excess of 300 μm has an adverse effect on film flexibility and moisture permeability. A range of 10 μm to 100 μm is even more preferred. The film thickness is measured by a dial gage and expressed as mean thickness (measured using a 1/1000-mm dial thickness gage (made by Teclock) in a state in which no load except a spring load is applied from the outside).

In the hydrophobic porous film used in the present invention, the surfaces inside the pores should preferably be coated with a water- or oil-repellent resin. A resin having fluorine-containing side chains can be used as such a coating resin. Such resins and methods for fashioning these resins into composites with porous films are disclosed in detail in WO94/22928. An example is shown below.

The coating resin should be a fluororesin (preferably one whose fluorinated alkyl moiety has 6 to 16 carbon atoms) obtained by polymerizing a fluoroalkyl acrylate and/or fluoroalkyl methacrylate expressed by the general formula below.

Chemical Formula 1

(where n is an integer from 3 to 13, and R is a hydrogen or a methyl group).

This resin is used to coat the pores of a porous film on the inside by a method in which an aqueous microemulsion of this resin (mean grain size: 0.01–0.5 µm) is formed using a fluorine-containing surfactant (for example, ammonium perfluorooctanoate), the pores of the porous film are impregnated therewith, and the product is heated. As a result of these operations, the water and fluorinated surfactant are removed and the fluororesin melts down and covers the surfaces inside the pores of the porous film, yielding a highly water- and oil-repellent porous film having intercommunicating pores. Further examples of suitable resins include AF Polymer® (manufactured by Du Pont) and Cytop® (manufactured by Asahi Glass). The surfaces inside the pores of the macromolecular porous film should be covered with these resins by a method in which these resins are dissolved in Fluorinert® (manufactured by 3M) or another inert solvent, the macromolecular porous film is impregnated with the resulting solution, and the solvent is vaporized off.

Covering the surfaces inside the pores of a porous PTFE film or other porous film with the aforementioned organic polymers makes it more difficult for various contaminants to penetrate inside the porous film and prevents the hydrophobic properties of the porous film from being adversely affected.

A moisture-permeable resin should preferably be laminated on at least one side of the hydrophobic porous film. Such lamination may be carried out by coating, impregnation, or the like.

For example, the following methods may be used to coat or impregnate the porous film with a moisture-permeable resin. When the moisture-permeable resin is a polyurethane-based resin, it is possible to use a method in which a polyol and a polyisocyanate are mixed, applied while still fluid (before the curing reaction is completed), and cured by heating. Any suitable resin liquefaction method may also be used. Examples include methods in which a hot-melt adhesive is heated, fluidized, applied, and cured, and methods in which a dispersion solution is applied and then cured by heating. Specific examples of such application methods include dipping and spraying, as well as techniques involving the use of gravure rolls, reverse rolls, doctor rolls, kiss rolls, and the like.

When a laminate comprising a porous film and a moisture-permeable resin is used as part of a garment, the moisture-permeable resin should preferably be disposed facing the body. This is because using the moisture-permeable resin on the side facing the body allows sebum, perspiration, and other body contaminants to be blocked by the nonporous moisture-permeable resin layer and makes it possible to prevent situations in which the macromolecular porous film is contaminated with these contaminants and loses some of its waterproofness.

The porous PTFE film used in the present invention can be fabricated according to a conventionally known method for manufacturing common porous PTFE films. It is possible, for example, to use the fabrication method described in JP (Kokoku) 51-18991. Specifically, a molding paste in the form of a mixture of PTFE fine powder, petroleum naphtha, and other lubricant aids is fashioned into a tapered article by paste extrusion (used either alone or in combination with calendering), the lubricant aid is removed by heating the molded article, and the product is then stretched uniaxially or biaxially at a temperature below the melting point of PTFE, yielding a porous PTFE film. The article may also be baked (cooled after being heated to a temperature above the melting point of PTFE while fixed in the stretched state) in order to preserve the fine open-pore structure obtained by calendering and to improve dimensional stability.

Examples of methods for obtaining a porous PTFE film containing a luminescent substance include (1) methods in which a particulate luminescent substance (grain size: about 1–30 µm) is added in advance to a PTFE fine powder at the same time as the aid is added, and (2) methods involving the use of a PTFE fine powder that contains luminescent substance and is obtained by adding a particulate luminescent substance during the polymerization of the PTFE fine powder and copolymerizing the product.

The porous PTFE film that contains a luminescent substance and is used in the present invention should preferably have a thickness of 5–500 µm (particularly 10–100 µm), a maximum pore diameter of 0.05–5 µm (particularly 0.1–1.0 µm), and a porosity of 50–90% (particularly 70–85%).

The porous PTFE film that contains a luminescent substance and is used in the present invention may be a laminated film. Examples include laminated films that comprise porous PTFE films containing a luminescent substance and porous PTFE films devoid of a luminescent substance, and laminated films that comprise two or more porous PTFE films containing a luminescent substance.

Of these, laminated films that comprise a porous PTFE film (a) containing a luminescent substance and a porous PTFE film (b) devoid of a luminescent substance are preferred for use. Following is an example of the preferred method for producing such laminated films.

The term "sheet (b')" refers to an unstretched PTFE sheet devoid of a luminescent substance, and the term "sheet (a')" refers to an unstretched PTFE sheet containing a luminescent substance.

Sheet (b') can be obtained by a method in which a liquid lubricant (solvent naphtha, white oil, or the like) is admixed into a PTFE resin fine powder (crystallinity: 95% or greater) according to a common technique, and the resulting mixture is extruded and calendered using an extrusion apparatus, calendering apparatus, and the like. In this case, the lubricant content of the mixture should be 10–30 mass percent, and preferably 15–20 mass percent. The mean grain size of the PTFE fine powder should be 400–700 nm, and preferably 450–550 nm. The extrusion and calendering should be conducted at a temperature of 22–70° C., and preferably 25–50° C. Sheet (b') should have a thickness of 0.1–5 mm, and preferably 0.2–1 mm.

Sheet (a') is fabricated by a method in which a luminescent substance is added to a PTFE dispersion, the components are co-coagulated, and the product is dried, yielding a dried PTFE product containing a luminescent substance. A lubricant is admixed into the dried product in the same manner as in the case of sheet (b'), and the resulting mixture is extruded and calendered using an extrusion apparatus and a calendering apparatus, yielding sheet (a'). The luminescent substance should be admixed into the PTFE dispersion in an amount of 1–50 mass percent (relative to PTFE solids). The reason for this is that if the content of the luminescent substance is less than 1 mass percent, the luminescent properties of the porous PTFE film containing the luminescent substance are adversely affected, and the resulting luminous composite fabric has poor luminescence capabilities. A content of 15 mass percent or greater is even more preferred. A sheet containing more than 50% of luminescent substance is difficult to process, the porous PTFE film containing the luminescent substance has low strength, and the luminous composite fabric is likely to have inadequate physical durability. A content of 30 mass percent or less is even more preferred. In addition, sheet (a') should have a thickness of 0.1–5 mm, and preferably 0.2–1 mm.

Sheet (b') is then superposed on one side of sheet (a'), and the two sheets are calendered together (yielding a composite sheet consisting of a calendered sheet laminate). The sheets can be calendered by means of rolls. The calendering temperature should be 20–70° C., and preferably 30–50° C. The draw ratio of the calendered sheet should be 1.5–10, and preferably 3–5. The thickness of the sheet (a') in the calendered sheet laminate should be 0.05–2 mm, and preferably 0.1–1 mm. Similarly, the thickness of sheet (b') should be 0.05–2 mm, and preferably 0.1–1 mm. The ratio of the thickness of sheet (b') relative to sheet (a') should be 0.05–10, and preferably 0.5–2.

The composite sheet consisting of the above-described calendered sheet laminate is subsequently heated to a temperature above the boiling point of the lubricant (for example, 200–260° C.), the lubricant is vaporized off, and the product is then stretched. The product is stretched uniaxially or biaxially with the aid of a common sheet stretching apparatus at a temperature below the melting point of PTFE by about 20–150° C., and preferably by about 20–30° C. The corresponding stretching rate should be 10%/sec or less, and preferably 100–1000%/sec. The draw ratio should be 1–50, and preferably 9–15.

The stretched product is subsequently baked at a temperature of 327–380° C., and the product structure is fixed. The composite stretched sheet thus obtained is a composite film comprising film (a) containing a luminescent substance, and film (b) devoid of this substance.

Such a composite film (laminated film) has excellent waterproofness, and this waterproofness can be sustained by one of the films if the other film develops pinholes.

The function of the porous PTFE film (b) devoid of a luminescent substance is to reflect light emitted by the porous PTFE film (a) containing the luminescent substance, making it possible to enhance the light emitted toward film (a) of the laminated film and to improve visibility on the side of film (a).

The number of laminated films is not limited to a single film containing a luminescent substance and a single film devoid of a luminescent substance, and more than one film of each type can be laminated together.

Alternatively, a moisture-permeable resin or an adhesive containing a luminescent substance can be applied to the hydrophilic nonporous resin film, hydrophobic porous film, or other resin film on the side facing the fabric 1, and characters or drawing patterns indicating a brand name or a company name can be formed. Because the characters or drawing patterns thus formed can be seen through the fabric, the aesthetic qualities of the garment are improved and the brand name or company name can be made more visible when, for example, this composite fabric is used as part of a garment. The aesthetic qualities or visibility can be improved even further by preparing several types of moisture-permeable resins or adhesives containing luminescent substances of various colors, and forming the aforementioned characters or drawing patterns by combining these colors.

The fabric 1 used in the present invention will now be described.

The essential function of the fabric is to protect or support the resin layer containing a luminescent substance. The fabric may be a woven, knit, nonwoven, netted, or other product composed of synthetic or natural fibers. The following natural fibers are preferred for use: fibers based on polyamides, polyesters, polyurethanes, polyolefins, polyvinyl chloride, polyvinylidene chloride, polyfluorocarbons, polyacrylics, and the like. Cotton, hemp, animal hair, silk, and other fibers should preferably be used as the natural fibers. Nylon (polyamide) and polyester wovens or knits are particularly suitable because of considerations related to aesthetic properties, strength, durability, and the like.

An important feature of the present invention is that the fabric must have high light transmittance because light from the resin sections containing a luminescent substance is emitted outside through the fabric. Another important feature is that because the resin sections that contain a luminescent substance and are formed on the reverse side of the fabric are designed, for example, to store optical energy from the outside through the fabric, the transmittance of the fabric at the wavelength of the optical energy must be high because the luminescence capabilities of the resin sections is determined by this transmittance. Specifically, the light transmittance of the fabric should preferably be 10% or greater in the 350-nm waveband, and 15% or greater in the 500-nm waveband. When light transmittance at the 350-nm wavelength is less than 10%, outside energy is markedly attenuated in the fabric section, so light is less likely to reach the resin layer containing a luminescent substance, and it takes longer for the energy to be absorbed. When light transmittance at the 500-nm wavelength is less than 15%, the optical energy generated by the luminescent substance is attenuated in the fabric section, adversely affecting the luminescence capabilities of the luminous composite fabric. It is even more preferable for light transmittance to be 20% or greater in the 350-nm waveband, and 30% or greater in the 500-nm waveband.

When the luminous composite fabric of the present invention is used as part of a rain garment, and the fabric exposed on the external surface absorbs water, a water film forms on the surface of the rain garment, the moisture permeability of the luminous composite fabric is adversely affected, the mass of the luminous composite fabric increases, and the garment becomes less comfortable to wear. For this reason, the fabric should preferably be treated with a fluorine-based water repellent, a silicone-based water repellent, or another type of water repellent.

The protective fabric 7 may be composed of the same type of material as the fabric, but a knit product is particularly suitable for use. The reason is that the protective fabric is used on the reverse side of the luminous composite fabric, so there is no particular need to take the external appearance of the fabric into consideration in the manner adopted for the fabric used on the surface. In addition, a knit product with coarser meshes than those of a woven product is preferred because when a filling tape is bonded or fused to a rain garment, using a material with coarser meshes on the reverse side (bonding surface) of the luminous composite fabric provides the filling tape with better sealing properties. Another advantage of using a knit product is that the luminous composite fabric is more lightweight than when a woven product or the like is used.

WORKING EXAMPLES

The present invention will now be described in further detail through Working Examples.

Working Example 1

A polyester-based polyurethane adhesive system in which trimethylolpropane tolylene diisocyanate adduct served as a curing agent was used as the starting material for the adhesive. This system (100 mass parts) was mixed with 10 mass parts of the luminescent substance $SrAl_2O_4$:Eu,Dy (N-Yako G-300M®, manufactured by Nemoto & Co.) and made into an adhesive (hereinafter referred to as "an adhesive containing a luminescent substance") with a viscosity of 4000 cps at 25° C.

The fabric was a product (white; 100% nylon; 70 denier; plain weave; warp density: 120 per inch; weft density: 90 per inch) whose light transmittance was 34.7% at a wavelength of 350 nm and 42.3% at a wavelength of 500 nm.

The adhesive containing the luminescent substance was applied in dots to the reverse side of the fabric (bonding area of the adhesive containing the luminescent substance: 35%), and the fabric was heat-treated first for 60 minutes at 60° C. and 100% RH and then for 5 minutes at 150° C., yielding the luminous composite fabric 10 Working Example 1.

Working Example 2

A roll coater was used to apply a urethane resin solution to one side of a porous PTFE film (thickness: 30 μm, mean pore diameter: 0.2 μm, porosity: 85%), and the coated film was first dried for 5 minutes at 100° C. and then heat-treated for 10 minutes at 160° C., yielding a backing member (devoid of a luminescent substance). The urethane resin solution had been obtained by dissolving 5 mass parts of a trifunctional tolylene diisocyanate adduct and 100 mass parts of a polyether polyurethane containing oxyethylene groups in a mass ratio of 60–65% in a mixed solvent (obtained by mixing 50 mass parts dimethylformamide and 50 mass parts xylene). The polyether polyurethane was a polyurethane comprising diphenylmethane diisocyanate and polyol.

Working Example 3

The adhesive containing a luminescent substance prepared in Working Example 1 was used for the spot bonding (adhesive coverage ratio was set to 35%) of a fabric (the same fabric as in Working Example 1) and the backing member devoid of a luminescent substance, yielding the luminous composite fabric 30 of Working Example 3. The adhesive was transferred to the surface of the porous PTFE film, the fabric was superposed thereon, and the layers were compressed and laminated together between rolls. A heat treatment was performed for 5 minutes at 150° C. during lamination.

Working Example 4

A polyester-based polyurethane adhesive system in which trimethylolpropane tolylene diisocyanate adduct served as a curing agent was used as the adhesive containing a luminescent substance (viscosity: 3500 cps at 25° C.).

The backing member containing a luminescent substance was a urethane-coated porous PTFE film obtained by a method in which a urethane resin solution was applied in the same manner as in Working Example 2 to one side of a porous PTFE film (thickness: 30 μm; mean pore diameter: 0.2 μm; porosity: 85%; content of luminescent substance: 15 mass percent) containing the luminescent substance $SrAl_2O_4$:Eu,Dy (N-Yako G-300M®, manufactured by Nemoto & Co.), and the coated film was dried and heat-treated.

A fabric (the same fabric as in Working Example 1) and the urethane-coated porous PTFE film were spot bonded (adhesive coverage ratio was set to 35%) by said adhesive devoid of a luminescent substance, yielding the luminous composite fabric 40 of Working Example 4. The adhesive was transferred to the surface of the porous PTFE film, the fabric was superposed thereon, and the layers were compressed and laminated together between rolls. A heat treatment was performed for 5 minutes at 150° C. during lamination.

Working Example 5

The luminous composite fabric 50 of Working Example 5 was obtained by the same method as in Working Example 3 except that the adhesive containing a luminescent substance of Working Example 1 was used.

Working Example 6

A knit product (100% nylon, 20 denier, 28-gauge tricot half) was used as a protective layer, and this knitted product was bonded in a dot configuration (adhesive coverage ratio: 40%; the adhesive was applied to the surface of the moisture-permeable resin film 5) with the aid of an adhesive on the reverse side of a luminous composite fabric prepared according to Working Example 4 above, yielding the luminous composite fabric 60 of Working Example 6. The adhesive was a polyester-based polyurethane adhesive system in which trimethylolpropane tolylene diisocyanate adduct was used as a curing agent. A heat treatment was performed for 5 minutes at 150° C. during lamination.

Working Example 7

The rain garment of Embodiment 8 was fabricated, with the fabric 1 of the luminous composite fabric 60 pertaining to Working Example 6 facing outward. The luminous composite fabric 60 of Working Example 6 was used over the entire surface of the rain garment. A filling tape (Gore Seam Tape 3L®; width: 22 mm; manufactured by Japan Gore-Tex) was fused on the reverse side over the seams of the rain garment (the knitted (protective fabric 7) side of the luminous composite fabric) in order to seal the areas containing the seams.

Comparative Example 1

Screen printing was used to imprint the surface of the fabric used in Working Example 1 with a coating solution obtained by mixing 100 mass parts of an aqueous acrylic emulsion (AE318®, manufactured by Japan Synthetic Rubber) and 10 mass parts of the luminescent substance $SrAl_2O_4$:Eu,Dy (N-Yako G-300M®, manufactured by Nemoto & Co.). The fabric imprinted with this coating solution was then heat-treated and dried for 5 minutes at 150° C.

Comparative Example 2

A resin sheet (Loihi Tape 100®, manufactured by Sinloihi) containing a luminescent substance was bonded to the surface of the fabric used in Working Example 1, and the sheet was sewn around the periphery, yielding a luminous composite fabric.

Comparative Example 3

Ethylene glycol was added to a hydrophilic polyurethane resin (Hypol 2000®, manufactured by Dow Chemical) in an NCO/OH equivalent ratio of 1, the luminescent substance $SrAl_2O_4$:Eu,Dy (N-Yako G-300M®, manufactured by Nemoto & Co.) was then added in an amount of 10 mass parts to 100 mass parts of the polyurethane prepolymer, and the components were mixed together, yielding a coating solution. The coating solution was applied with a knife coater to the surface of the same fabric 1 as in Working Example 1 in a coating amount of 50 g/m² and heat-treated for 60 minutes at 100° C. and 100% RH, yielding a luminous composite fabric.

Comparative Example 4

The adhesive was a polyester-based polyurethane adhesive system in which trimethylolpropane tolylene diisocyanate adduct was used as a curing agent. This adhesive was mixed in an amount of 100 mass parts with 10 mass parts of the luminescent substance $SrAl_2O_4$:Eu,Dy (N-Yako G-300M®, manufactured by Nemoto & Co.) and made into an adhesive containing the luminescent substance (viscosity: 4000 cps at 25° C.).

The fabric was a product (blue; 100% nylon; 70 denier; plain weave; warp density: 120 per inch; weft density: 90 per inch) whose light transmittance was 8.2% at a wavelength of 350 nm and 13.7% at a wavelength of 500 nm. The adhesive containing the luminescent substance was applied in dots to the reverse side of the fabric (bonding area of the adhesive: 35%), yielding the same luminous composite fabric as in Working Example 1. A heat treatment was performed for 5 minutes at 150° C. during lamination.

Study of Working Examples and Comparative Examples

The following methods were used to measure the characteristics of the luminous composite fabrics and rain garments of the working and comparative examples described above.

(1) Moisture Permeability

Measured according to method B-2 of JIS L 1099. The results were converted to 24-hr values.

(2) Abrasion Test

The Martindale abrasion tester described in JIS L 1096 was used, a luminous composite fabric was mounted in the abrasion mode on the side of the abrasion cloth mount, a reference wool abrasion cloth was mounted on the side of the sample holder, and the front side of the luminous composite fabric (the surface on the fabric side) was rubbed with the reference woven wool fabric under a load of 12 kPa. After being rubbed 50,000 times, the fabric was used to evaluate the afterglow characteristics described below.

(3) Illumination Photometry by Light Exposure

Measured using a digital illuminometer (IM-5, manufactured by Topcon).

(4) Transmittance of Ultraviolet and Visible Light

The ability of the fabric to transmit ultraviolet and visible light was measured using a spectrophotometer (UV3100, manufactured by Shimadzu).

(5) Afterglow Characteristics

A luminous composite fabric was cut into 15-cm squares, placed on a horizontal table with the surface of the luminous composite fabric facing upward, and irradiated for 20 minutes with a D65 reference light source at an illuminance of 200 Ix. The irradiation was then stopped, the luminous composite fabric was placed in a dark chamber, and the afterglow characteristics were visually evaluated 10 and 30 minutes later according to a 4-point grading system (4: shape clearly distinguishable; 3: presence of a sample readily discernible, observation with the unaided eye possible; 2: barely observable with the unaided eye; 1: cannot be observed with the unaided eye).

(6) Hand Tests

Luminous composite fabrics that had been cut into 20-cm squares were compared by a tactile method, and the resulting feel was evaluated according to a 5-point grading system ranging from "extremely soft" to "extremely hard" (A: extremely soft, B: moderately soft, C: regular, D: moderately hard, E: extremely hard).

(7) Testing of Luminous Water Resistance

A luminous composite fabric that had been cut into 5-cm squares was immersed for 48 hours in distilled water adjusted to 50° C., naturally dried at room temperature, and evaluated for its afterglow characteristics.

(8) Testing for Use As Rain Garment

A rain garment fabricated according to Working Example 6 was worn for 6 months as a work garment for outdoor use in rainy weather. The garment was then disassembled, and the luminous composite fabric was cut out and used as a sample for various tests.

The test results are shown in Tables 1 and 2. Table 1 shows the light transmittances displayed at wavelengths of 200–650 nm by the fabrics 1 used in Working Example 1 and comparative example 4, and Table 2 shows the results of evaluating the luminescent properties, moisture permeability, and hand of the luminous composite fabrics produced in Working Examples 1–6 and comparative examples 1–4. The values for Working Example 6 are evaluation results for a fabric sample taken from a rain garment that had been tested (worn for 6 months).

TABLE 1

| Wavelength (nm) | Transmittance | |
|---|---|---|
| | Working Example 1 | Comparative Example 5 |
| 220 | 4.4 | 0.4 |
| 250 | 9.1 | 0.5 |
| 300 | 25.7 | 2.4 |
| 350 | 34.7 | 8.2 |
| 400 | 35.7 | 17.3 |
| 450 | 41.8 | 24.6 |
| 500 | 42.3 | 13.7 |
| 550 | 42.4 | 4.3 |
| 600 | 42.6 | 1.2 |
| 650 | 42.9 | 1.2 |
| 700 | 43 | 25.4 |

TABLE 2

|  | Initial afterglow characteristics D65 | | Post-abrasion afterglow characteristics D65 | | Luminous water resistance D65 | Moisture | |
| --- | --- | --- | --- | --- | --- | --- | --- |
|  | 10 min | 30 min | 10 min | 30 min | After 10 min | permeability | Hand |
| WE 1 | 3 | 3 | 3 | 3 | 3 | 23,000 | A |
| WE 2 | 4 | 3 | 4 | 3 | 4 | 12,000 | B |
| WE 3 | 3 | 3 | 3 | 3 | 3 | 12,000 | B |
| WE 4 | 4 | 3 | 4 | 3 | 4 | 12,000 | B |
| WE 5 | 4 | 3 | 4 | 3 | 4 | 7000 | C |
| WE 6 | 3 | 3 | 3 | 3 | 3 | 7000 | B |
| CE 1 | 4 | 3 | 1 | 1 | 4 | 1200 | B |
| CE 2 | 4 | 3 | 3 | 3 | 4 | 200 | D |
| CE 3 | 4 | 3 | 4 | 3 | 1 | 5000 | B |
| CE 4 | 2 | 1 | 2 | 1 | 2 | 12,000 | B |

WE: Working Example; CE: comparative example

It can be seen in Table 2 above that the luminous composite fabric of Working Examples 1–6 is superior to Comparative Examples 1 and 3 in terms of moisture permeability and luminescence durability. The luminous composite fabric of Comparative Example 2 has excellent luminescence capabilities but possesses inferior moisture permeability and hand, and thus cannot be regarded as acceptable for use on the entire surface of a rain garment. Compared with Working Example 1, Comparative Example 4 yields a fabric of low light transmittance, and is hence incapable of affording adequate luminescence capabilities. The results of Working Example 6 demonstrate that the luminous composite fabric of the present invention is sufficiently durable when used in actual apparel applications.

The luminous composite fabrics of Comparative Examples 1–4 differ greatly from regular fabrics in terms of their outward appearance and are not easy to use in uniforms and other garments with fixed design specifications. By contrast, the luminous composite fabrics and rain garments pertaining to the Working Examples of the present invention have the same outward appearance as regular fabrics and are not limited in any way in terms of outward appearance when used in rain garments or the like.

Although the luminous composite fabric and garment pertaining to the present invention was described in detail with reference to the above examples, the present invention is not limited in any way by these examples and can be implemented by being modified in an appropriate manner within the range of the above-described features. All such modifications fall within the technical scope of the present invention.

Merits of the Invention

The luminous composite fabric pertaining to the present invention is configured such that a backing member containing a luminescent substance and/or an adhesive containing a luminescent substance is applied to the reverse side of the fabric, making light emitted by the luminescent substance visible through the fabric. It is therefore possible to provide a luminous composite fabric that remains substantially unaffected by the luminance-reducing external contamination or physical loading and that retains its luminescence capabilities even when used for a long time. Another feature is that because the light-emitting portions are positioned outside the surface layer of the garment, it is possible to provide a garment having excellent aesthetic qualities without altering in any way the inherent color tone of the garment, the clothing design, or the like. The luminous composite fabric pertaining to the present invention has excellent features and is suitable for use in outerwear, underwear, headwear, gloves, socks, and other types of clothing, as well as footwear, tents, sleeping bags, bedclothes, capes, curtains, and other types of textile or sheet products.

Without intending to limit the scope of the present invention, the following examples illustrate how the present invention may be made and used:

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A luminous composite fabric having an obverse side and a reverse side, characterized in that the reverse side of the fabric is covered partially or completely with a backing member having a first side facing the fabric and a second side facing away from the fabric and containing a luminescent substance, wherein the backing member is provided with a protective fabric layer on the second side.

2. A luminous composite fabric having an obverse side and a reverse side, characterized in that the reverse side of the fabric is covered partially or completely with a backing member via an adhesive, the backing member having a first side facing the fabric and a second side facing away from the fabric, wherein a protective fabric layer is provided on the second side; and a luminescent substance is added to the adhesive and/or the backing layer.

3. A luminous composite fabric as defined in claim 1, wherein the backing member is composed of a resin material.

4. A luminous composite fabric as defined in claim 2, wherein the backing member is composed of a resin material.

5. A luminous composite fabric as defined in claim 3, wherein the resin material is composed of a moisture-permeable resin.

6. A luminous composite fabric as defined in claim 5, wherein the moisture-permeable resin has a stratified structure.

7. A luminous composite fabric as defined in claim 6, wherein the moisture-permeable resin is composed of a plurality of layers, the fabric-side layer of these plurality of layers contains a luminescent substance, and the layer on the opposite side is substantially devoid of a luminescent substance.

8. A luminous composite fabric as defined in claim 7, wherein the plurality of layers are laminated such that the moisture-permeable resin substantially devoid of a luminescent substance is caused to partially penetrate into the moisture-permeable voids of the moisture-permeable resin layer containing a luminescent substance.

9. A luminous composite fabric as defined in claim 1, wherein the backing member has adhesive properties and occupies 5–90% of the surface area on the reverse side of the fabric.

10. A luminous composite fabric as defined in claim 3, wherein the backing member has adhesive properties and occupies 5–90% of the surface area on the reverse side of the fabric.

11. A luminous composite fabric as defined in claim 5, wherein the backing member has adhesive properties and occupies 5–90% of the surface area on the reverse side of the fabric.

12. A luminous composite fabric as defined in claim 5, wherein the moisture-permeable resin is provided with a stretched porous polytetrafluoroethylene film.

13. A luminous composite fabric as defined in claim 6, wherein the moisture-permeable resin is provided with a stretched porous polytetrafluoroethylene film.

14. A luminous composite fabric as defined in claim 7, wherein the moisture-permeable resin is provided with a stretched porous polytetrafluoroethylene film.

15. A luminous composite fabric as defined in claim 8, wherein the moisture-permeable resin is provided with a stretched porous polytetrafluoroethylene film.

16. A luminous composite fabric as defined in claim 8, wherein the moisture-permeable resin containing a luminescent substance is a stretched porous polytetrafluoroethylene film; and the moisture-permeable resin layer substantially devoid of a luminescent substance is composed of urethane.

17. A luminous composite fabric as defined in claim 1, wherein a material containing an aluminate compound is used as the luminescent substance.

18. A luminous composite fabric as defined in claim 1, wherein a material having a light transmittance of 10% or greater at 350 nm, and 15% or greater at 500 nm, is used as the fabric.

19. A garment, characterized in that a luminous composite fabric as defined in claim 1 is used over all or part of the garment surface, with the obverse side of the fabric positioned on the side away from the body.

20. A luminous composite fabric as defined in claim 16, wherein a material containing an aluminate compound is used as the luminescent substance.

21. A luminous composite fabric as defined in claim 16, wherein a material having a light transmittance of 10% or greater at 350 nm, and 15% or greater at 500 nm, is used as the fabric.

22. A garment, characterized in that a luminous composite fabric as defined in claim 16 is used over all or part of the garment surface, with the obverse side of the fabric positioned on the side away from the body.

23. A luminous composite fabric as defined in claim 4, wherein the resin material is composed of a moisture-permeable resin.

24. A luminous composite fabric as defined in claim 23, wherein the moisture-permeable resin has a stratified structure.

25. A luminous composite fabric as defined in claim 24, wherein the moisture-permeable resin is composed of a plurality of layers, the fabric-side layer of the plurality of layers containing a luminescent substance, and the layer on the opposite side is substantially devoid of a luminescent substance.

26. A luminous composite fabric as defined in claim 25, wherein the plurality of layers are laminated such that the moisture-permeable resin substantially devoid of a luminescent substance is caused to partially penetrate into the moisture-permeable voids of the moisture-permeable resin layer containing a luminescent substance.

27. A luminous composite fabric as defined in claim 2, wherein the backing member has adhesive properties and occupies 5–90% of the surface area on the reverse side of the fabric.

28. A luminous composite fabric as defined in claim 4, wherein the backing member has adhesive properties and occupies 5–90% of the surface area on the reverse side of the fabric.

29. A luminous composite fabric as defined in claim 23, wherein the backing member has adhesive properties and occupies 5–90% of the surface area on the reverse side of the fabric.

30. A luminous composite fabric as defined in claim 23, wherein the moisture-permeable resin is provided with a stretched porous polytetrafluoroethylene film.

31. A luminous composite fabric as defined in claim 24, wherein the moisture-permeable resin is provided with a stretched porous polytetrafluoroethylene film.

32. A luminous composite fabric as defined in claim 25, wherein the moisture-permeable resin is provided with a stretched porous polytetrafluoroethylene film.

33. A luminous composite fabric as defined in claim 26, wherein the moisture-permeable resin is provided with a stretched porous polytetrafluoroethylene film.

34. A luminous composite fabric as defined in claim 26, wherein the moisture-permeable resin containing a luminescent substance is a stretched porous polytetrafluoroethylene film; and the moisture-permeable resin layer substantially devoid of a luminescent substance is composed of urethane.

35. A luminous composite fabric having an obverse side and a reverse side, characterized in that the reverse side of the fabric is covered partially or completely with a backing member comprising stretched porous polytetrafluoroethylene, the backing member having a first side facing the fabric and a second side facing away from the fabric and containing a luminescent substance, wherein a protective fabric layer is provided on the second side of the backing member.

* * * * *